United States Patent
Nesemann et al.

(10) Patent No.: US 10,218,290 B2
(45) Date of Patent: Feb. 26, 2019

(54) INVERTER HAVING AT LEAST ONE INVERTER BRIDGE BETWEEN TWO BUSBARS

(71) Applicant: SMA Solar Technology AG, Niestetal (DE)

(72) Inventors: Karl Nesemann, Lohfelden (DE); Andreas Falk, Kassel (DE); Henning Schneider, Schotten (DE)

(73) Assignee: SMA Solar Technology AG, Niestetal (DE)

( * ) Notice: Subject to any disclaimer, the term of this patent is extended or adjusted under 35 U.S.C. 154(b) by 384 days.

(21) Appl. No.: 14/856,831

(22) Filed: Sep. 17, 2015

(65) Prior Publication Data
US 2016/0006371 A1   Jan. 7, 2016

Related U.S. Application Data

(63) Continuation of application No. PCT/EP2014/054049, filed on Mar. 3, 2014.

(30) Foreign Application Priority Data

Mar. 18, 2013 (DE) ........................ 10 2013 102 707

(51) Int. Cl.
*H02M 7/537* (2006.01)
*H02M 7/00* (2006.01)

(52) U.S. Cl.
CPC ........... *H02M 7/537* (2013.01); *H02M 7/003* (2013.01)

(58) Field of Classification Search
CPC .............................. H02M 7/537; H02M 7/003
See application file for complete search history.

(56) References Cited

U.S. PATENT DOCUMENTS 7,397,116 B2 * 7/2008 Onishi ................ H01L 27/0207
257/691
2002/0034087 A1 3/2002 Suzuki et al.
(Continued)

FOREIGN PATENT DOCUMENTS

DE        10044570 A1    4/2001
EP         1445853 A2    8/2004
(Continued)

OTHER PUBLICATIONS

International Search Report dated Oct. 9, 2014 for International Application No. PCT/EP2014/054049.

*Primary Examiner* — Jue Zhang
(74) *Attorney, Agent, or Firm* — Eschweiler & Potashnik, LLC

(57) ABSTRACT

An inverter has an inverter bridge connected between two DC busbars on the input side and connected to an AC output on the output side. The two DC busbars run, in a manner overlapping one another, in planes which are parallel to one another. The inverter bridge has a subcircuit having a plurality of semiconductor switches between the AC output and each DC busbar. Semiconductor modules which form the two subcircuits are connected, in a manner arranged beside one another, to the two DC busbars and to the AC output via connections. A connection element which leads to the AC output begins on that side of the DC busbar which faces the semiconductor modules in a region overlapped by the DC busbars and connects the semiconductor modules of the two subcircuits to one another there.

19 Claims, 4 Drawing Sheets

(56) References Cited

U.S. PATENT DOCUMENTS

| | | | |
|---|---|---|---|
| 2004/0104446 A1* | 6/2004 | Yoshizaki | H01L 23/051 257/448 |
| 2007/0109715 A1* | 5/2007 | Azuma | B60K 6/28 361/299.3 |
| 2007/0252169 A1* | 11/2007 | Tokuyama | H02M 7/003 257/162 |
| 2008/0266915 A1 | 10/2008 | Eckardt | |
| 2009/0257212 A1 | 10/2009 | Takano et al. | |
| 2011/0221268 A1* | 9/2011 | Kanazawa | H05K 1/0263 307/10.1 |
| 2013/0063067 A1 | 3/2013 | Tanaka | |

FOREIGN PATENT DOCUMENTS

| | | |
|---|---|---|
| EP | 1553687 A2 | 7/2005 |
| JP | 2007215396 A | 8/2007 |
| WO | 9414227 | 6/1994 |

\* cited by examiner

INVERTER HAVING AT LEAST ONE INVERTER BRIDGE BETWEEN TWO BUSBARS

REFERENCE TO RELATED APPLICATIONS

This application is a Continuation of International Application number PCT/EP2014/054049 filed on Mar. 3, 2014, which claims priority to German Application number 10 2013 102 707.5 filed on Mar. 18, 2013, the contents of which are incorporated by reference in their entirety.

FIELD

The disclosure relates to an inverter comprising an inverter bridge, which is connected on the input side between two DC busbars and on the output side to an AC output, wherein the inverter bridge has a subcircuit comprising a plurality of semiconductor switches between the AC output line and each DC busbar.

BACKGROUND

A known central inverter having the model designation "CP" by the applicant has an inverter comprising an inverter bridge, which is connected on the input side between two DC busbars and on the output side to an AC output line, wherein the inverter bridge has a parallel circuit comprising two semiconductor switches between the AC output line and each DC busbar. Owing to the parallel circuit of semiconductor switches, an increased current-carrying capacity is achieved in comparison with in each case only one semiconductor switch. The known inverter is therefore particularly suitable for high alternating currents output via the AC output line. In the specific design configuration, the known inverter has two semiconductor modules arranged next to one another, which each form two semiconductor switches connected in parallel. The semiconductor modules are connected to the two DC busbars and to the AC output via connections on connection sides oriented in the same spatial direction. In this case, the two DC busbars extend overlapping one another in parallel planes with respect to one another. A connection element which leads to the AC output is connected to the two semiconductor modules in a region which is not overlapped by the DC busbars. In the known inverter, not only one such inverter bridge is provided, but a plurality of identical inverter bridges are connected to rims of the same two DC busbars. In this case, the semiconductor modules are fitted with their fitting sides opposite the connection sides on a common heat sink.

In another known inverter comprising an inverter bridge, which is connected on the input side between two DC busbars and on the output side to an AC output line, the inverter bridge has a series circuit comprising two semiconductor switches between the AC output line and each DC busbar. The series circuits comprising semiconductor switches serve the purpose of allowing the voltages present across the inverter bridge and/or between the AC output and the two DC busbars to form as voltage drops across a plurality of semiconductor switches. The individual semiconductor switches can therefore have a lower dielectric strength than in the case of a half bridge which has in each case only one semiconductor switch between the AC output line and each DC busbar. Such an inverter is therefore particularly suitable for high input voltages.

DE 100 44 570 A1 discloses an inverter having a modular design. The inverter comprises a central unit and a plurality of power units. The central unit has an AC voltage output and a plug-type connector female connector. The power units each have a DC voltage input and a plug-type connector female connector and a plug-type connector male connector. A power unit can be plugged with its plug-type connector male connector into the plug-type connector female connector of the central unit. Further power units can then each be plugged with their plug-type connector male connector into the plug-type connector female connector of the previously connected power unit. Each power unit has an inverter and a controller driving said inverter.

DE 10 2005 060 354 A1 discloses a modular converter system. This system has a converter basic device and at least one converter additional device, wherein these devices can be plugged laterally with one another by means of their mains and load conductor bar and by means of a communications line and are thus connected in parallel.

WO 94/14227 A1 discloses a three-phase inverter and has an inverter bridge comprising two semiconductor modules arranged next to one another on a heat sink for each phase. Each semiconductor module comprises a semiconductor switch. Initially, two DC busbars, to which the inverter bridges are connected on the input side, extend above the heat sink. Above this, in a further plane, plate-shaped connection elements for the individual phases of the AC output of the inverter extend parallel to the DC busbars. These plate-shaped connection elements are electrically insulated with respect to the DC busbars and the DC busbars are electrically insulated with respect to one another. Connections of the upper DC busbar to the semiconductor modules extend through the lower DC busbar, and connections from the plate-shaped connection elements to the semiconductor modules extend through both DC busbars.

DE 601 19 865 T2, a translation of EP 1 195 884 B1, discloses a three-phase inverter comprising three pairs of semiconductor switches, which are arranged between two DC busbars. Output-side connection elements which are connected to a center point of each pair likewise extend between the DC busbars. Such a pairwise interposition of semiconductor switches between DC busbars is also known from JP 2007215396 A.

US 2009/0257212 A1 describes a semiconductor module comprising two semiconductor switches, which are connected in series between two input connections, and an output connection, which is connected to the center point of the switches. The input connections are arranged one above the other on one side of the housing of the semiconductor module. The output connection is provided on the opposite side of the housing.

SUMMARY

The disclosure relates to an inverter comprising an inverter bridge, which is connected on the input side between two DC busbars and on the output side to an AC output, wherein the two DC busbars extend, overlapping one another, in mutually parallel planes. The inverter bridge has a subcircuit comprising a plurality of semiconductor switches between the AC output and each DC busbar, wherein semiconductor modules, which form the two subcircuits, are arranged next to one another, in particular along a common rim of the two DC busbars. The semiconductor modules are connected to the two DC busbars and the AC output via connections, wherein a connection element, which leads to the AC output, begins on that side of the DC busbars which faces the semiconductor modules in a region overlapped by the DC busbars and connects the semiconductor modules of the two subcircuits to one another there.

In the case of an inverter according to one embodiment of the disclosure comprising an inverter bridge, which is connected on the input side between two DC busbars and on the output side to an AC output and which has a series circuit comprising semiconductor switches between the AC output line and each DC busbar, semiconductor modules which form the two series circuits are arranged next to one another and are connected to the two DC busbars and to the AC output via connections. In this case, the two DC busbars extend, overlapping one another, in mutually parallel planes. A connection element, which leads to the AC output, begins on that side of the DC busbars which faces the semiconductor switches in a region overlapped by the DC busbars and connects the semiconductor modules of the two series circuits to one another there.

This embodiment of the inverter according to one embodiment of the disclosure can be distinguished from a known inverter, whose inverter bridge has a parallel circuit comprising semiconductor switches between an AC output line and each DC busbar, exclusively by the connections of the semiconductor modules, to which the DC busbars, on the one hand, and the AC output line, on the other hand, are connected. It is unconventional here that the connection element which is part of the output line extends as far as beneath the DC busbars. This unconventional configuration enables the use of substantially the same component parts as in a known inverter, whose inverter bridge has semiconductor switches connected in parallel, and this even with a substantially identical arrangement, however.

In one embodiment the connections of the semiconductor modules can be formed on connection sides of the semiconductor modules which are oriented in the same spatial direction, and the connection element can emerge beneath the DC busbars between the connections of the semiconductor modules of the two subcircuits. By virtue of lateral spacing of the semiconductor modules or at least their connections, a sufficient line cross section can then be realized for the connection element without complicated connection of the busbars to the connections and without complex configuration of the connection element. Thus, the connection element can be a substantially flat metal sheet, for example comprising copper.

Such a metal sheet can extend beneath the DC busbars in a further plane parallel to the DC busbars in one embodiment.

In another embodiment, the connections of the semiconductor modules to the two DC busbars are formed on input connection sides, oriented in the same spatial direction, of the semiconductor modules, and the connections to the connection element are formed on output connection sides, which are opposite one another in pairs, of the semiconductor modules, however. The connection element then emerges beneath the DC busbars between the semiconductor modules of the two subcircuits and can thus maintain a relatively large spacing with respect to the DC busbars. This is advantageous, for example, as regards capacitive coupling between the connection element and the DC busbars which is as low as possible. The lateral connections for the connection element in this embodiment can also be provided in addition to the connections which are oriented in the same spatial direction as the connections to the DC busbars for the connection element of the above-described embodiment. Then, the connection element can optionally be connected at the top or at the side to the semiconductor modules.

In one embodiment one DC busbar can have a cutout in each case where the other DC busbar is connected to a connection of the semiconductor modules. When the DC busbar is turned away from the semiconductor modules, these cutouts facilitate the connection of the other DC busbar. When the DC busbar faces the semiconductor modules, the cutouts can pass through the electrical connection up to the other DC busbar.

In one embodiment one insulation layer can be arranged between the two DC busbars and between the DC busbar facing the semiconductor modules and the connection element. In principle, sufficient electrical insulation can also be provided by an air gap. However, there is then the risk of a short circuit owing to the ingress of impurities.

In one embodiment of the inverter according to the disclosure, each of the subcircuits is formed by a semiconductor module. That is to say that the inverter bridge has two semiconductor modules. Each module in this case comprises at least two semiconductor switches.

Alternatively, however, it is also possible for each of the subcircuits to only be produced by the electrical connection of two or more semiconductor modules. In particular, in one embodiment a semiconductor module can form in each case at least one series circuit comprising two semiconductor switches, and at least two semiconductor modules arranged next to one another can be connected in parallel in each subcircuit. By virtue of the semiconductor switches connected in series, the subcircuits are rated for high voltages and, owing to the semiconductor modules connected in parallel, the subcircuits are at the same time rated for high currents.

All of the semiconductor modules of the inverter according to one embodiment of the disclosure can be physically identical, i.e. not only physically identical with semiconductor modules of another inverter, whose inverter bridge comprises parallel circuits of semiconductor switches instead of series circuits, but also with respect to one another.

The usability of the semiconductor modules in addition to inverters comprising an inverter bridge which has series circuits of semiconductor switches even for inverters having an inverter bridge which has parallel circuits of semiconductor switches is ensured, for example, by virtue of the fact that the semiconductor modules have series circuits of their semiconductor switches and have connections to intermediate points on their connection sides, said intermediate points in each case being formed after half of the semiconductor switches in each series circuit. In one embodiment, these connections to the intermediate points can be arranged in a region of the semiconductor modules forming the series circuits which is not covered by the DC busbars. If a semiconductor module has a plurality of parallel series circuits comprising semiconductor switches, a common connection to the intermediate points of all of its series circuits is provided.

Even if a greater number of semiconductor switches can be provided in the inverter according to one embodiment of the disclosure, wherein an even number of semiconductor switches per subcircuit is desired, so that intermediate points can be formed after in each case half of the semiconductor switches in a series circuit, the desired number of semiconductor switches per semiconductor module and subcircuit is two.

Semiconductor modules comprising a series circuit comprising two semiconductor switches and an accessible intermediate point are available at low cost and in high quality.

Such available semiconductor modules often each have two connections for connecting each DC busbar to one of the series circuits and for connecting the connection element to each of the series circuits. This dual connection normally distributes the currents among the in each case two connections and ensures failsafety in the event of a faulty connection.

An inverter according to one embodiment of the disclosure typically has not only one, but a plurality of identical inverter bridges. These identical inverter bridges can be formed using physically identical component parts. In this case, specifically the semiconductor modules forming the subcircuits of a plurality of inverter bridges can be connected to a common rim of the same DC busbars.

If the semiconductor modules forming the subcircuits are fitted with their fitting sides remote from the DC busbars on a heat sink of the inverter according to one embodiment of the disclosure, they can be fitted in particular on a rim of the same heat sink. In this way, it is possible for a plurality of inverter bridges connected on the input side to the same DC busbars to be connected in parallel very easily.

In an inverter comprising an inverter bridge according to one embodiment, which is connected on the input side between two DC busbars and on the output side to an AC output, the two DC busbars extend, overlapping one another, in mutually parallel planes, and the inverter bridge has a parallel circuit comprising a plurality of semiconductor switches between the AC output and each DC busbar. The semiconductor modules which form the two parallel circuits are arranged next to one another, and the semiconductor modules are connected to the two DC busbars and the AC output via connections. In accordance with one embodiment of the disclosure a connection element, which leads to the AC output, begins on that side of the DC busbars which faces the semiconductor switches in a region overlapped by the DC busbars and connects the semiconductor modules of the two subcircuits to one another there.

That is to say that inverters constructed from substantially the same component parts in the same arrangement whose inverter bridges have series circuits comprising semiconductor switches or parallel circuits comprising semiconductor switches can also be configured in accordance with one embodiment of the disclosure in such a way that, in the case of inverter bridges with semiconductor switches connected in parallel, the output lines begin beneath the DC busbars of the inverters. In this case, in the case of the inverters which have inverter bridges comprising series circuits comprising semiconductor switches, the connection elements can be connected to the semiconductor modules of the two series circuits in a region which is not covered by the DC busbars. For this purpose, differently configured semiconductor modules are required than in the above-described first embodiment of the disclosure, which uses commercially available semiconductor modules as a basis. Conversely, however, in one embodiment only lower voltages, as occur in the case of inverter bridges comprising semiconductor switches connected in parallel, are present in the regions in which the connection elements extend in a further plane beneath the DC busbars, however.

Some embodiments of the disclosure are differentiated in various patent claims, in which the physical position of the connections with respect to the intermediate points of the series circuits provided by all of the semiconductor modules is defined. In the embodiments of the disclosure with semiconductor switches connected in series in each subcircuit these connections are arranged in a region of the semiconductor modules which is not covered by the DC busbars and contact can be made there with semiconductor switches connected in parallel in each subcircuit for an inverter based on the same semiconductor modules. In the embodiments of the disclosure with semiconductor switches connected in parallel in each subcircuit, the connections to all of the intermediate points are arranged in that region of the semiconductor modules which is covered by the DC busbars. In order to form an inverter which is based on the same semiconductor modules and comprises semiconductor switches connected in series in each subcircuit, the common rim of the DC busbars needs to be laid back in order to be able to connect the connection element in a region of the semiconductor modules which is not covered by the DC busbars. In principle, reference is generally made in the patent claims to a "subcircuit comprising a plurality of semiconductor switches" instead of a "series circuit comprising semiconductor switches" or a "parallel circuit comprising semiconductor switches".

Advantageous developments of the disclosure result from the patent claims, the description and the drawings. The advantages, mentioned in the description, of features and of combinations of a plurality of features are merely by way of example and can take effect alternatively or cumulatively without the advantages necessarily of embodiments according to the disclosure needing to be achieved. Without the subject matter of the attached patent claims being changed hereby, the following applies as regards the disclosure content of the original application documents and the patent: further features can be gleaned from the drawings, in particular the illustrated geometries and the relative dimensions of a plurality of component parts with respect to one another and the relative arrangement and operative connection thereof. The combination of features of different embodiments of the disclosure or of features of different patent claims is likewise possible departing from the selected back-references in the patent claims and is hereby suggested. This also relates to those features which are illustrated in separate drawings or are mentioned in the description thereof. These features can also be combined with features of different patent claims. Likewise, features mentioned in the patent claims can be dispensed with for further embodiments of the disclosure.

The features mentioned in the patent claims and the description should be understood in respect of their number such that precisely this number or a greater number than the mentioned number is provided without explicit use of the adverb "at least" being required. If, therefore, an or one element is discussed, for example, this should be understood to mean that precisely one element, two elements or more elements are provided. These features can be supplemented by other features or can be the only features of which the respective product consists.

The reference symbols contained in the patent claims do not restrict the scope of the subjects protected by the patent claims. They merely serve the purpose of making the patent claims more easily understandable.

BRIEF DESCRIPTION OF THE DRAWINGS

The disclosure will be explained and described in more detail below with reference to the attached drawings.

DETAILED DESCRIPTION

The term "DC busbar" is used for a busbar at an electrical potential in the present description. An inverter bridge extends between two such DC busbars.

Figure 1:
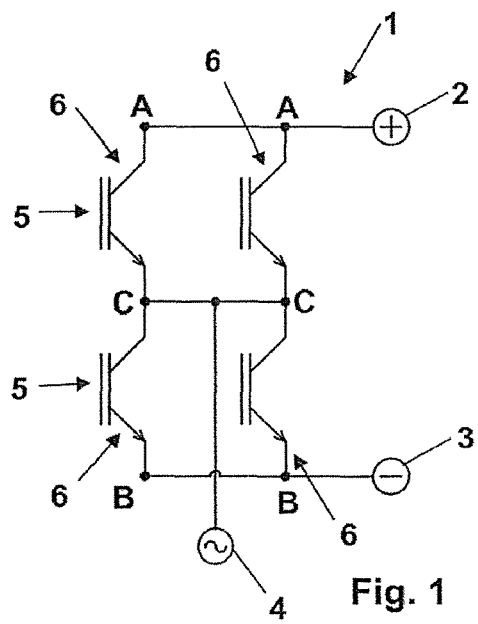
FIG. 1 shows a basic circuit diagram of an inverter bridge comprising semiconductor switches connected in parallel.

In one embodiment the inverter bridge 1 illustrated in FIG. 1 has two DC inputs 2 and 3 and an AC output 4. The DC input 2 is in this case provided for a positive potential with respect to the DC input 3. The inverter bridge 1 has in each case one parallel circuit 5 comprising two semiconductor switches 6 between the AC output 4 and the DC inputs 2 and 3. Beyond the parallel circuits 5, the semiconductor switches 6 in FIG. 1 are divided into a left-hand group and a right-hand group and are connected in series in each of these groups. In this embodiment, the mutually corresponding connection points for the two groups of semiconductor switches 6 are provided with the same letters A, B and C. The end points A are connected to the DC input 2, the end points B are connected to the DC input 3 and the intermediate points C are connected to the AC output 4.

Figure 2:
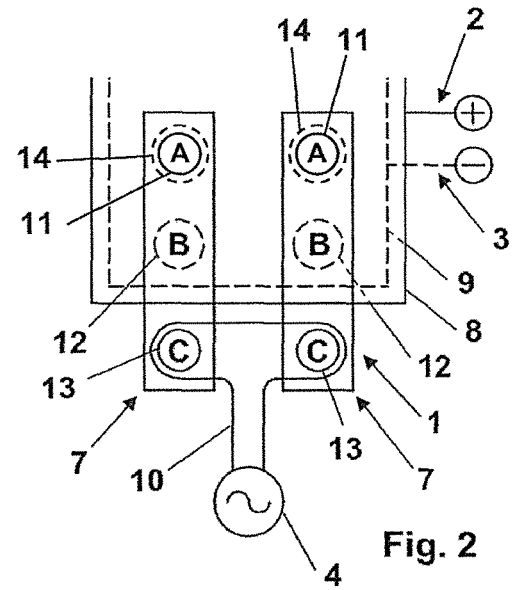
FIG. 2 shows an implementation of the inverter bridge shown in FIG. 1 comprising two semiconductor modules in accordance with the prior art.

FIG. 2 shows an implementation of the inverter bridge 1 with the aid of two physically identical semiconductor modules 7, which each comprise a group of semiconductor switches 6 as shown in FIG. 1, i.e. two semiconductor switches 6 connected in series between the end points A and B in FIG. 1. The semiconductor modules 7 are arranged next to one another along a common rim of two DC busbars 8 and 9. The two DC busbars 8 and 9 form the DC inputs 2 and 3. A connection element 10 leads to the AC output 4. The connection points A, B and C are in the form of connections 11 to 13 on a connection side of the semiconductor modules 7 which faces the DC busbars 8 and 9. The connections 11 are in this case connected to the busbar 8, the connections 12 are connected to the busbar 9, and the connections 13 are connected to the connection element 10. In this case, the connections 11 protrude through cutouts 14 in the busbar 9, which extends between the busbar 8 and the semiconductor modules 7. The connections 13 are formed in a region of the semiconductor modules 7 which is not covered by the busbars 8 and 9.

Figure 3:
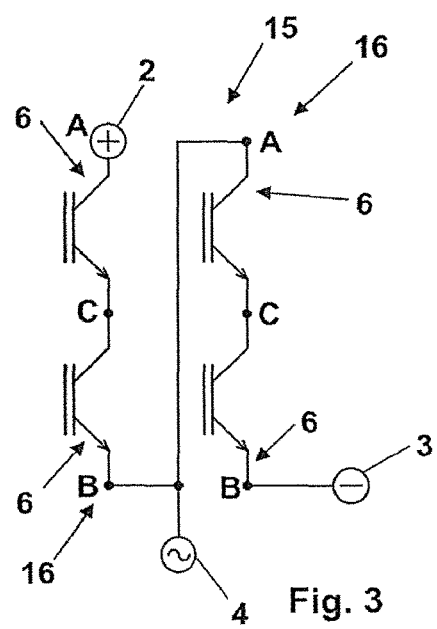
FIG. 3 shows a schematic circuit diagram of an inverter bridge comprising two series circuits comprising semiconductor switches.

FIG. 3 shows an inverter bridge 15 according to another embodiment, which can in principle be constructed from the same semiconductor switches 6 as the inverter bridge 1 shown in FIG. 1. The inverter bridge 15 has in each case one series circuit 16 comprising two semiconductor switches 6 between its AC output 4 and its two DC inputs 2 and 3, however. In this case, the position of the connection points A to C of the semiconductor switches 6 is arranged spatially in precisely the same way as in FIG. 1.

Figure 4:
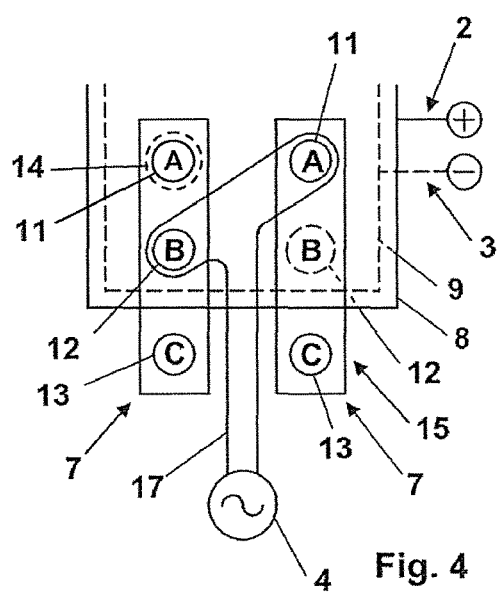
FIG. 4 shows an implementation according to the disclosure of the inverter bridge shown in FIG. 3 with the same semiconductor modules as in FIG. 2.

FIG. 4 shows an implementation of the inverter bridge 15 embodiment shown in FIG. 3 with the same semiconductor modules 7 as are also used for the inverter bridge 1 in FIG. 2. The spatial arrangement of the semiconductor modules 7 partially beneath the busbars 8 and 9 is also the same as in FIG. 2. A connection element 17 for connecting the two semiconductor modules 7 to the AC output 4 is designed differently than the connection element 10 shown in FIG. 2, however. The connection element 17 reaches to beneath the DC busbars 8 and 9 and is connected there to the connection 12 of one and the connection 11 of the other semiconductor module 7. Furthermore, the DC busbar 8 is connected to the remaining connection 11 of one semiconductor module 7 and the DC busbar 9 is connected to the remaining connection 12 of the other semiconductor module 7. The connections 13 of the semiconductor modules 7 remain free in this embodiment. Apart from this connection configuration and the different connection elements 10 and 17 necessary for this, the component parts 7 to 9 and their spatial arrangement are the same in FIGS. 2 and 4.

Figure 5:
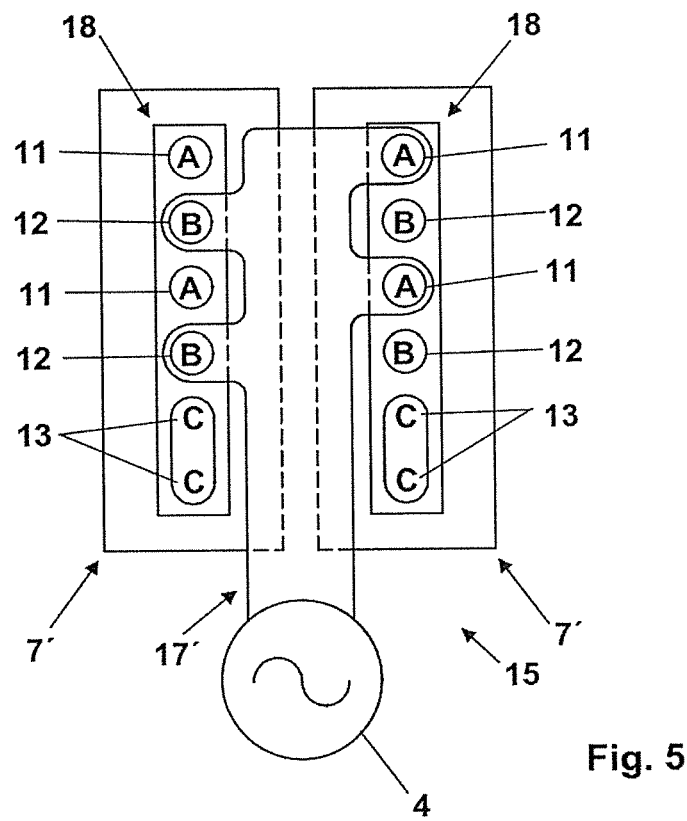
FIG. 5 shows another implementation in accordance with the disclosure of the inverter bridge shown in FIG. 3 comprising other semiconductor modules.

The inverter bridge 15 shown in FIG. 3, which, in contrast to the inverter bridge 1 shown in FIG. 1, is rated for higher voltages between its DC inputs 2 and 3, but for lower currents, is embodied in FIG. 5 by two semiconductor modules 7', which differ from the semiconductor modules 7 shown in FIGS. 2 and 4 in that they each have two connections 11 to 13 in an exposed connection region 18. The connection element 17' is correspondingly formed slightly differently than the connection element 17 shown in FIG. 4. The busbars 8 and 9 shown in FIGS. 2 and 4 are not illustrated in FIG. 5.

It is possible for the inverter bridge 15 shown in FIG. 3 to be additionally rated for higher currents in a simple manner. For this purpose, in the corresponding embodiment shown in FIG. 4, in each case one further semiconductor module 7, which has a series circuit comprising two semiconductor switches 6, can be arranged both to the left and to the right of the semiconductor modules 7 already illustrated. The further semiconductor module 7 arranged to the left of the existing left-hand semiconductor module 7 is connected electrically in parallel with the left-hand semiconductor module 7 at its connection points A and B. The same applies to the connection points A and B of the existing right-hand semiconductor module 7 and the further semiconductor module 7 which is positioned to the right thereof. For the semiconductor modules 7 to the left, their connection points A can be connected in parallel, for example, in such a way that the connection 11 of the further semiconductor module 7 is in each case connected to the DC busbar 8 in the same way as the connection 11 of the existing left-hand semiconductor module 7. The connection points B of the left-hand semiconductor modules 7 can be connected in parallel, for example, via a bent-back extension of the connection element 17. Correspondingly, the connection points A and B of the right-hand semiconductor modules 7 can also be connected in parallel.

Figure 6:
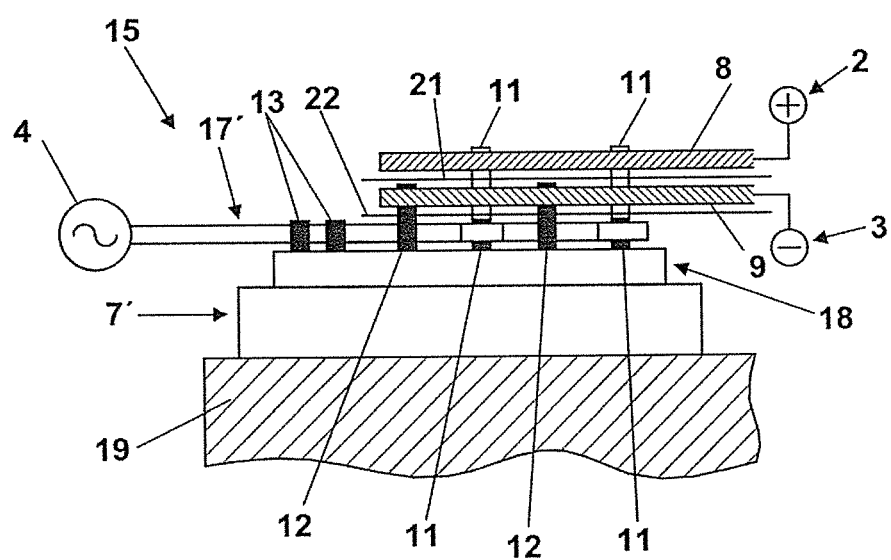
FIG. 6 shows a side view of the implementation in accordance with the disclosure of the inverter bridge shown in FIG. 5.

In the side view of the embodiment shown in FIG. 5 with a viewing direction from the right in FIG. 5, as can be seen in FIG. 6, the DC busbars 8 and 9 are also illustrated. In this case, it is shown schematically how the DC busbar 9 is connected to the connections 12 of the fully visible, front semiconductor module 7', while the DC busbar 8 is connected to the connections 11 of the otherwise hidden (because it is further towards the rear) semiconductor module 7'. The connection element 17' is connected to the connections 11 of the front semiconductor module 7' and the connections 12 of the semiconductor module 7' behind this. Contact is not made with the connections 13 as in FIG. 5. The semiconductor modules 7' are arranged on a heat sink 19, which extends parallel to the DC busbars 8 and 9 on a contact-making side of the semiconductor modules 7' which is opposite the connection side of the DC busbars. Insulation layers 21 and 22 between the DC busbars 8 and 9 and the DC busbar 9 and the connection element 17' are only indicated in FIG. 6. A plurality of inverter bridges 15 comprising in each case physically identical semiconductor modules 7' can be formed between the rims of the DC busbars 8 and 9 and the heat sink 19. For example, three inverter bridges 15 can provide a three-phase AC connection between the rims of the DC busbars 8 and 9 with their assigned connection elements 17'. Alternatively, however, it is also possible for all of the connection elements 17' of the inverter bridges to be connected to a current busbar (not illustrated here) as common AC output.

Figure 7:
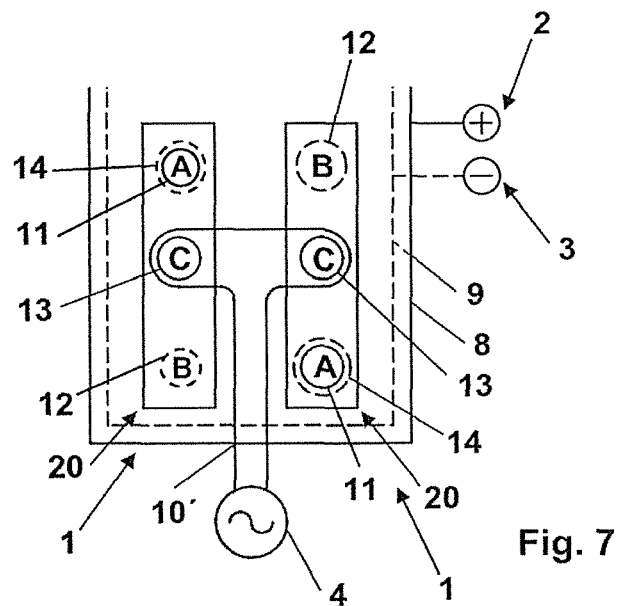
FIG. 7 shows a further implementation according to the disclosure of the inverter bridge shown in FIG. 1 with two different semiconductor modules.

In another embodiment, FIG. 7 shows an inverter bridge 1 as shown in FIG. 1, embodied with different semiconductor modules 20 than in FIG. 2. In this case, the differences substantially relate to the spatial arrangement of the connections 11 to 13, which lead to the connection points A to C shown in FIG. 1. In addition, in this case one semiconductor module 20 is rotated through 180° in the plane of the drawing with respect to the other semiconductor module 20, which is arranged parallel thereto and spaced apart therefrom. In order to achieve the same connection points as in FIG. 2, the DC busbars 8 and 9 forming the DC inputs 2 and 3 extend over all of the connections 11 to 13 of the two semiconductor modules 20. Correspondingly, the connection element 10' in this case extends down beneath the busbars 8 and 9.

Figure 8:
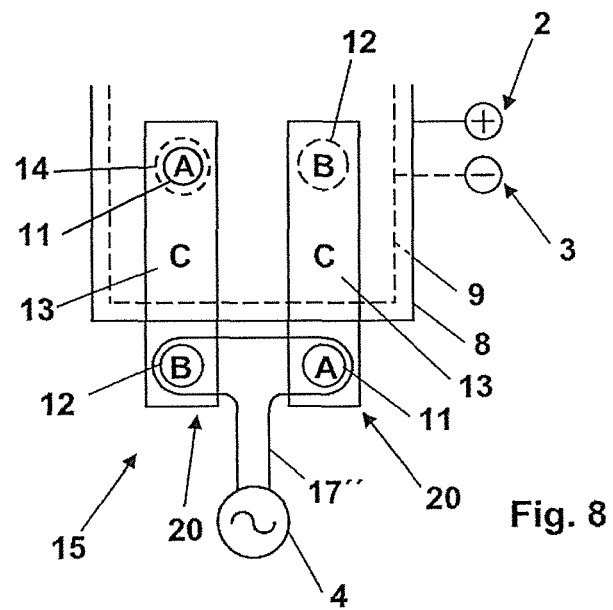
FIG. 8 shows an implementation of the inverter bridge shown in FIG. 3 with the semiconductor modules shown in FIG. 7.

FIG. 8 shows an embodiment of the inverter bridge 15 shown in FIG. 3 with the same semiconductor modules 20 as in FIG. 7 and also with the same relative arrangement of these semiconductor modules 20. However, the common rim of the DC busbars 8 and 9 is offset towards the rear in comparison with FIG. 7. Thus, the busbars 8 and 9 do not in this case cover all of the connections of the semiconductor modules 20, but leave the connection 12 of one semiconductor module 20 and the connection 11 of the other semiconductor module 20 free, to which semiconductor modules the connection element 17", leading to the AC output 4, is connected. That is to say that the connection element 17" is in this case not overlapped by the DC busbars 8 and 9. This embodiment can ensure improved insulation between the DC busbar 9 and the connection element 17 in the case of higher voltages between the DC busbars 8 and 9 than is the case for the corresponding embodiment shown in FIG. 4 between the DC busbar 9 therein and the AC connection element 17.

Figure 9:
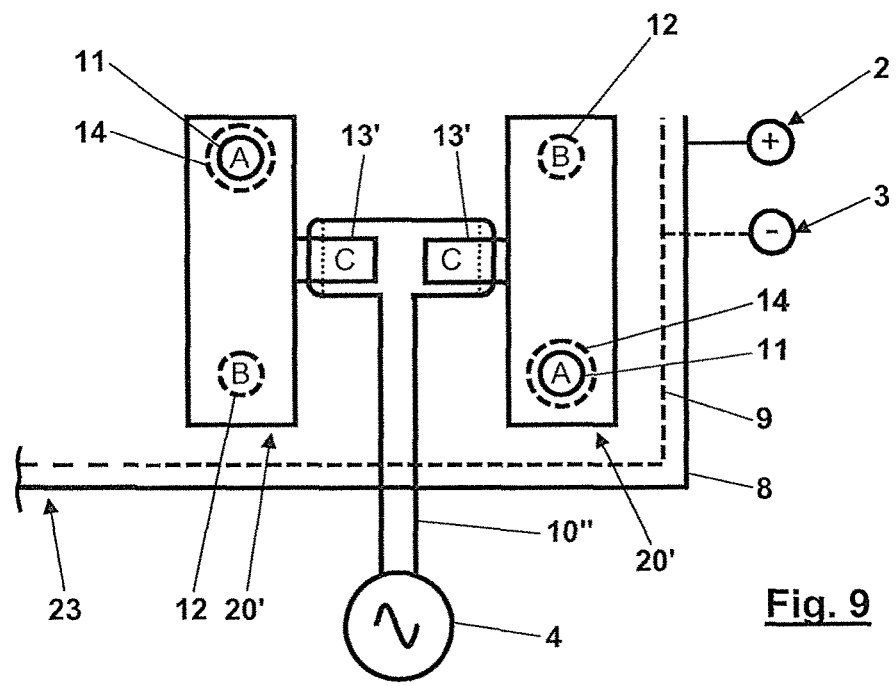
FIG. 9 shows yet a further implementation according to the disclosure of the inverter bridge shown in FIG. 1 with yet two different semiconductor modules.

In another embodiment FIG. 9 shows an inverter bridge as shown in FIG. 1 embodied with semiconductor modules 20'. These semiconductor modules 20' have, in comparison with the semiconductor modules 20 shown in FIGS. 7 and 8, connections 13' to the connection points C shown in FIG. 1 on output connection sides of the semiconductor modules 20', which are bent back through 90° with respect to input connection sides of the semiconductor modules 20' on which the connections 11 and 12 to the connection points A and B shown in FIG. 1 are formed and face one another. The connection element 10" can have, for this purpose, edges which are bent back in the form of a "U" in the region of the connection points C, when viewed from the direction of the AC connection 4. This is illustrated in FIG. 9 in the form of dashed lines at the connection element 10". These edges meet the connection points C at the ends and can thus be connected, for example screwed, thereto. However, it is also possible for the connection element 10" to be embodied without any edges which are bent back in the form of a "U" and to be connected, for example screwed, to the laterally arranged connections 13', from the direction of the plan view of FIG. 9. The connection element 10" can therefore connect the connections 13' between the semiconductor modules 20' with a greater spacing from the DC busbars 8 and 9 than in the embodiment shown in FIG. 7, as a result of which undesired capacitive coupling between the connection element 10" and the DC busbars 8, 9 is reduced.

Figure 10:
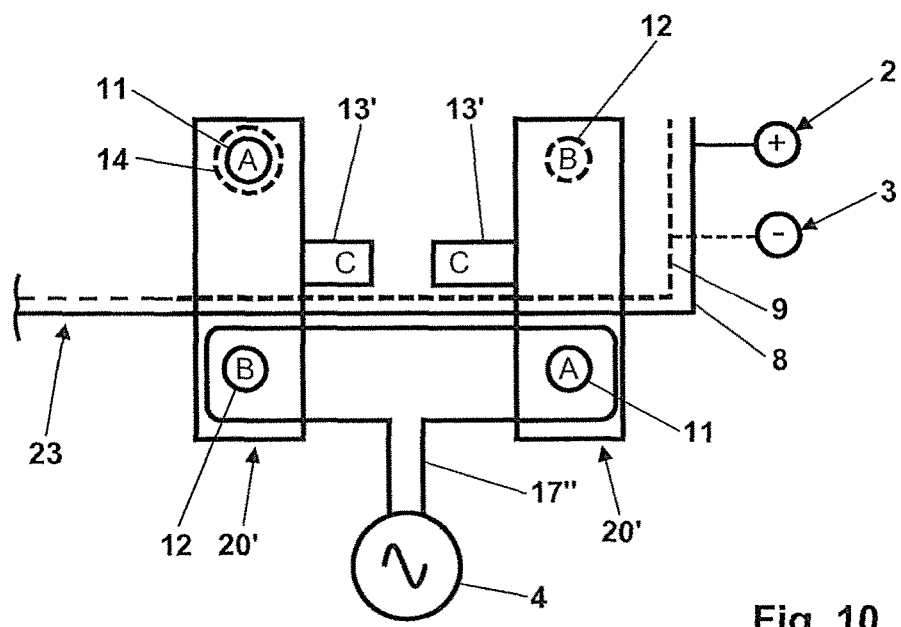
FIG. 10 shows an implementation of the inverter bridge shown in FIG. 3 comprising the semiconductor modules shown in FIG. 9.

The embodiment of the inverter bridge 15 shown in FIG. 3 with the same semiconductor modules 20' as in FIG. 9, which embodiment is illustrated in FIG. 10, has in principle the same differences from FIG. 9 as can be seen in FIG. 8 in comparison with FIG. 7. The connection element 17" is connected to in each case one connection 12 of one semiconductor module 20' and one connection 11 of the other semiconductor module 20' outside the region covered by the DC busbars 8 and 9. The spacing between the semiconductor modules 20' which is enlarged by the laterally protruding connection elements 13' which are not used here can be eliminated by rotation of the two semiconductor modules 20' through in each case 180° about their vertical axes, which are normal to the plane of the drawing, with the result that the connections 13' each point outwards. It goes without saying that even then the connection 11 of one semiconductor module 20' needs to be connected to the DC busbar 8 and the connection 12 of the other semiconductor module 20' needs to be connected to the DC busbar 9.

It is furthermore indicated in FIGS. 9 and 10 that a common rim 23 of the DC busbars 8 and 9 can have a greater extent than only for the connection of the two semiconductor modules 20' in order to connect, for example, further semiconductor modules 20' to the DC busbars 8 and 9. This can be used for the purpose of forming a plurality of inverter bridges of a polyphase inverter between the DC busbars 8 and 9. Even in the embodiments shown in FIG. 9 and FIG. 10, physically identical semiconductor modules 20' are used for implementing the inverter bridges 1 and 15, respectively. This is likewise the case for the implementation of the inverter bridge 1 shown in FIG. 2 or the implementation of the inverter bridge 15 shown in FIG. 4. Similarly, the implementation of the inverter bridge 1 shown in FIG. 7 or the implementation of the inverter bridge 15 shown in FIG. 8 has physically identical semiconductor modules 20. FIG. 5 only illustrates the implementation of the inverter bridge 15. In this case too, however, a corresponding implementation of the inverter bridge 1 would have physically identical semiconductor modules 7' to those in FIG. 5. An implementation of an inverter which is matched to different current and/or voltage conditions is therefore not necessarily linked to different physical shapes of the semiconductor modules, but can be performed using in each case physically identical semiconductor modules 7, 7', 20, 20'.

The invention claimed is:
1. An inverter comprising a single phase inverter bridge, which is connected on an input side thereof between two DC busbars and on an output side thereof to an AC output, wherein the two DC busbars extend, overlapping one another, in mutually parallel planes, wherein the single phase inverter bridge comprises a subcircuit between the AC output and each DC busbar, thereby defining two subcircuits, wherein semiconductor modules, which form the two subcircuits, are arranged next to one another, wherein the semiconductor modules are connected to the two DC busbars and the AC output via connections, and wherein a connection element, which leads to the AC output, connects the semiconductor modules of the two subcircuits to one another in a region overlapped by the DC busbars, wherein each subcircuit provided between the AC output and one of the DC busbars comprises a plurality of semiconductor switches, and wherein the connection element, which leads to the AC output, begins in the region overlapped by the DC busbars on a side of the DC busbars that faces the semiconductor modules, connects the semiconductor modules of the two subcircuits to one another there, and emerges beneath the DC busbars.

2. The inverter as claimed in claim 1, wherein the semiconductor modules which form the two subcircuits are arranged along a common rim of the two DC busbars.

3. The inverter as claimed in claim 1, wherein the connections are formed on connection sides, oriented in a same spatial direction, of the semiconductor modules, and wherein the connection element emerges beneath the DC busbars between the connections of the semiconductor modules of the two subcircuits.

4. The inverter as claimed in claim 1, wherein the connections to the DC busbars are formed on input connection sides, oriented in a same spatial direction, of the semiconductor modules, wherein the connections to the connection element are formed on output connection sides, which are opposite one another in pairs, of the semiconductor modules, and wherein the connection element emerges beneath the DC busbars between the semiconductor modules of the two subcircuits.

5. The inverter as claimed in claim 1, wherein the connection element extends beneath the DC busbars in a further parallel plane.

6. The inverter as claimed in claim 1, wherein one DC busbar has a cutout where the other DC busbar is connected to a connection of the semiconductor modules.

7. The inverter as claimed in claim 1, further comprising an insulation layer arranged between the two DC busbars and between that DC busbar which faces the semiconductor modules and the connection element.

8. The inverter as claimed in claim 1, wherein in each case one of the semiconductor modules forms one of the subcircuits.

9. The inverter as claimed in claim 1, wherein each of the semiconductor modules forms in each case at least one series circuit comprising two semiconductor switches, and wherein at least two semiconductor modules arranged next to one another are connected in parallel in each subcircuit.

10. The inverter as claimed in claim 1, wherein all of the semiconductor modules are physically identical.

11. The inverter as claimed in claim 1, wherein each semiconductor module has at least one series circuit comprising semiconductor switches, wherein connections to end points and to an intermediate point of the series circuit are formed on the semiconductor module, wherein the intermediate point is formed after half of the semiconductor switches in the series circuit.

12. The inverter as claimed in claim 1, wherein each semiconductor module has in each case two connections to each end point and to the intermediate point of the series circuit.

13. The inverter as claimed in claim 11, wherein the connections to the intermediate points of the semiconductor modules forming the series circuits are arranged at ends of the semiconductor modules in a region which is not covered by the DC busbars.

14. The inverter as claimed in claim 11, wherein the connections to the intermediate points are arranged between the connections to the end points of the semiconductor modules forming the series circuits in a region which is covered by the DC busbars.

15. The inverter as claimed in claim 1, wherein each subcircuit comprises two semiconductor switches.

16. The inverter as claimed in claim 1, wherein component parts forming a plurality of single phase inverter bridges are physically identical.

17. The inverter as claimed in claim 1, wherein the semiconductor modules forming the subcircuits of a plurality of single phase inverter bridges are connected to a common rim of the same DC busbars.

18. The inverter as claimed in claim 1, wherein the semiconductor modules forming the subcircuits are fitted with their fitting sides remote from the DC busbars on a heat sink.

19. The inverter as claimed in claim 1, wherein the semiconductor modules forming the subcircuits of a plurality of single phase inverter bridges are fitted on a rim of the same heat sink.

* * * * *